(12) United States Patent
Nyhoff et al.

(10) Patent No.: US 9,076,183 B2
(45) Date of Patent: Jul. 7, 2015

(54) MULTI-LATERALLY TRADED CONTRACT SETTLEMENT MODE MODIFICATION

(75) Inventors: John Nyhoff, Darien, IL (US); Lori Aldinger, Naperville, IL (US); John Labuszewski, Westmont, IL (US); Steven Youngren, Elgin, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 103 days.

(21) Appl. No.: 13/285,525

(22) Filed: Oct. 31, 2011

(65) Prior Publication Data

US 2013/0024347 A1   Jan. 24, 2013

Related U.S. Application Data

(63) Continuation-in-part of application No. 13/187,846, filed on Jul. 21, 2011, now Pat. No. 8,606,687, and a continuation-in-part of application No. 13/187,837, filed on Jul. 21, 2011.

(51) Int. Cl.
   *G06Q 40/04* (2012.01)

(52) U.S. Cl.
   CPC ...................................... *G06Q 40/04* (2013.01)

(58) Field of Classification Search
   None
   See application file for complete search history.

(56) References Cited

U.S. PATENT DOCUMENTS

| | | | |
|---|---|---|---|
| 5,262,942 A | 11/1993 | Earle | |
| 5,978,485 A | 11/1999 | Rosen | |
| 6,188,993 B1 | 2/2001 | Eng et al. | |
| 6,856,969 B1 | 2/2005 | Hache | |
| 7,593,884 B2 | 9/2009 | Rothman et al. | |
| 7,783,539 B2 | 8/2010 | Martin | |
| 7,809,631 B2 | 10/2010 | Bauerschmidt et al. | |
| 7,818,229 B2 * | 10/2010 | Imrey et al. | 705/35 |
| 8,249,961 B1 | 8/2012 | Hopkins | |
| 8,306,905 B2 | 11/2012 | Brouwer | |
| 8,341,053 B2 | 12/2012 | Jacob et al. | |
| 2002/0010670 A1 | 1/2002 | Mosler et al. | |
| 2003/0023546 A1 * | 1/2003 | Shepherd | 705/38 |

(Continued)

FOREIGN PATENT DOCUMENTS

WO   WO 2004/029850   *   4/2004   .............. G06F 17/60

OTHER PUBLICATIONS

U.S. Patent Application filed Jul. 21, 2011, U.S. Appl. No. 13/187,846, titled "Modification of Multi-Laterally Traded Contracts Based on Currency Unavailability Condition."

(Continued)

*Primary Examiner* — Robert R Niquette
(74) *Attorney, Agent, or Firm* — Banner & Witcoff, Ltd.

(57) ABSTRACT

Stored data may define a multilaterally-traded contract type and specify final settlement of contracts conforming to the contract type by delivery of a defined quantity of a commodity. Additional data may be received, which additional data may indicate potential invocation of an alternate cash settlement mode for a plurality of contracts. Each contract of the plurality may be a contract conforming to the contract type. Further data may be received, with the further data indicating the alternate cash settlement mode is invoked for a group of contracts. The group may be all of the contracts of the plurality or a sub-portion of the plurality. Data may be transmitted to indicate cash final settlement of each contract of the group by payment of a cash settlement value instead of by delivery of the defined quantity of the commodity.

18 Claims, 8 Drawing Sheets

(56) References Cited

U.S. PATENT DOCUMENTS

| | | | |
|---|---|---|---|
| 2003/0033240 A1* | 2/2003 | Balson et al. | 705/37 |
| 2003/0065594 A1 | 4/2003 | Murphy | |
| 2004/0006529 A1* | 1/2004 | Fung | 705/37 |
| 2005/0154660 A1* | 7/2005 | Sturm et al. | 705/35 |
| 2005/0192898 A1 | 9/2005 | Hache | |
| 2005/0262013 A1 | 11/2005 | Guthner et al. | |
| 2006/0224492 A1 | 10/2006 | Pinkava | |
| 2006/0224494 A1* | 10/2006 | Pinkava | 705/37 |
| 2007/0061260 A1* | 3/2007 | deGroeve et al. | 705/44 |
| 2007/0083459 A1* | 4/2007 | Eubanks | 705/38 |
| 2007/0136180 A1* | 6/2007 | Salomon et al. | 705/37 |
| 2007/0198437 A1 | 8/2007 | Eisner et al. | |
| 2007/0299775 A1 | 12/2007 | Algiene | |
| 2008/0059365 A1* | 3/2008 | Lee et al. | 705/38 |
| 2009/0234768 A1* | 9/2009 | Van Slyke | 705/37 |
| 2009/0254471 A1* | 10/2009 | Seidel et al. | 705/37 |
| 2010/0004999 A1* | 1/2010 | Depetris et al. | 705/14.71 |
| 2010/0114756 A1* | 5/2010 | Rodgers et al. | 705/37 |
| 2010/0121752 A1* | 5/2010 | Banigan et al. | 705/37 |
| 2010/0185562 A1* | 7/2010 | Nafeh | 705/36 R |
| 2010/0223174 A1* | 9/2010 | Thomas | 705/35 |
| 2010/0223178 A1 | 9/2010 | Schleicher | |
| 2010/0312689 A1 | 12/2010 | Bauerschmidt et al. | |
| 2011/0125633 A1 | 5/2011 | Aaltonen et al. | |
| 2013/0024340 A1 | 1/2013 | Co et al. | |
| 2013/0024345 A1 | 1/2013 | Co et al. | |
| 2013/0024346 A1 | 1/2013 | Co et al. | |

OTHER PUBLICATIONS

U.S. Patent Application filed Jul. 21, 2011, U.S. Appl. No. 13/187,837, titled "Interest Accrual Provisions for Multi-Laterally Traded Contracts."

U.S. Patent Application filed Oct. 31, 2011, U.S. Appl. No. 13/285,502, titled "Alternate Currency Derivatives."

International Search Report and Written Opinion for PCT/US12/47309, mailed Sep. 20, 2012.

International Search Report and Written Opinion for PCT/US12/47317, mailed Sep. 27, 2012.

International Search Report and Written Opinion for PCT/US12/47322, mailed Oct. 1, 2012.

International Search Report and Written Opinion for PCT/US12/47336, mailed Sep. 27, 2012.

CME Rulebook Chapter 260 (dated prior to Nov. 1, 2010).

* cited by examiner

MULTI-LATERALLY TRADED CONTRACT SETTLEMENT MODE MODIFICATION

CROSS-REFERENCE TO RELATED APPLICATIONS

This application is a continuation-in-part of commonly-owned U.S. application Ser. No. 13/187,846, filed Jul. 21, 2011, and titled "Modification of Multi-Laterally Traded Contracts Based on Currency Unavailability Condition," and is also a continuation-in-part of commonly-owned U.S. application Ser. No. 13/187,837, filed Jul. 21, 2011, and titled "Interest Accrual Provisions for Multi-Laterally Traded Contracts." Each of said applications, in its entirety, is incorporated by reference herein.

BACKGROUND

Participants in exchanges and other markets routinely buy, sell and otherwise deal in multi-laterally traded futures contracts. Such contracts may be standardized according to a contract type established by an exchange. A "long" or a "long counterparty" usually refers to a counterparty holding a long position in a futures contract. A long agrees to pay a contract price in return for the underlying commodity or asset at a predefined future date. A "short" or a "short counterparty" usually refers to a counterparty holding a short position in a futures contract. In some types of futures contracts, a short agrees to receive the final settlement price of the contract at the predefined future date in return for delivering the underlying commodity or asset. Other types of futures contracts may be brought to final settlement by cash settlement. The subject matter of the final settlement (e.g., what the short must provide to effect final settlement for contracts requiring delivery) is typically defined by the contract type and is the same for all contracts of that type. The contract price paid by the long is typically negotiated at the time the contract is entered.

For each multi-laterally traded futures contract, there is a long counterparty and a short counterparty. Generally, however, either the long or the short of each such contract is an exchange or clearinghouse. For example, a first counterparty may offer to sell a particular type of futures contract through an exchange. After the exchange publishes that offer, a second counterparty may purchase a futures contract of that type through the exchange at the offered price. The exchange then establishes a first contract in which the first counterparty is the short and the exchange clearinghouse is the long, and an offsetting second contract in which the second counterparty is the long and the exchange is the short, with the contract price of the first and second contracts (the accepted offer price of the first counterparty) being the same. The first and second counterparties do not know each other's identities.

As indicated above, some types of futures contracts are cash settled, i.e., there is a final mark-to-market of outstanding contracts subsequent to the last day of trading. Futures contracts may also require other types of payments. For example, a clearinghouse may require mark-to-market payments on a periodic basis or when the current value of a futures contract is less than a certain percentage of a party's margin account with the clearinghouse. These and other payments must typically be made in a currency that is specified by the futures contract. A market generally assumes that such payments will be unimpeded by illiquidity in a market for the specified currency, inconvertibility of the specified currency, non-transferability of the specified currency, or other scenarios in which the specified currency might not be readily available. Although exchange rates of various currencies relative to one another may fluctuate, conventional futures contracts typically contemplate an unrestricted availability of a specified currency on commercially reasonable terms. If adequate supplies of a specified currency are not available, it may be difficult to settle or otherwise make payments in connection with a futures contract.

As also indicated above, some types of futures contracts are "physically" settled, i.e., the short counterparty agrees to deliver the actual commodity at final settlement. In some cases, the short may do so by literally providing the contract amount of the quantity to a location specified by the contract (e.g., delivery of crude oil to an oil terminal, delivery of grain to a grain elevator). In other cases, the short may deliver the contracted—for commodity by providing documents (e.g., warehouse receipts representing commodities in storage) or other evidence establishing that the contracted—for amount of the quantity has been provided (e.g., data confirming transfer of a note, bond, stock or other financial instrument to a specified account). Some physical settlements can involve transfer of money. For example, a foreign currency futures contract could require transfer of a contract amount of a foreign currency (e.g., Euros, Yen, etc.) at final settlement in return for payment of the contract price in a different currency (e.g., U.S. Dollars).

In some cases, adequate supplies of a physical commodity may be unavailable, or physical delivery might otherwise by impractical for a large portion of short counterparties. Similarly, numerous long counterparties may have difficulty taking physical delivery. As but one example, a futures contract may call for delivery of 1,000 barrels of crude oil at one of several physical storage facilities that are owned and operated by private parties. Credit market concerns or other issues beyond the control of numerous counterparties may prevent those counterparties from making or taking delivery.

In the context of over-the-counter derivatives, forward contracts and other instruments traded and carried on a bilateral basis, parties have been known to reach various accommodations on a contract-by-contract basis. For example, two parties might agree that final settlement could be made in an alternative manner (e.g., paying an equivalent amount of a foreign currency or a cash value of a particular commodity) and/or deferred until a later date. However, there are qualitative and quantitative differences between bilaterally-traded derivatives and derivatives traded on a multi-lateral basis. Although it is often simple for two parties to work out an accommodation of an unforeseen contingency, futures contracts must account for the needs of a potentially large number of market participants.

As indicated above, futures contracts are typically standardized so as to facilitate selling, offsetting, and otherwise creating a functioning market for a contract of a particular type. At any one time there may be a large number of outstanding futures contracts of a particular type. Each of those contracts may have very similar terms (e.g., deliver a specified amount of a currency of other commodity on a specified date), but may involve different parties. Even if the parties to each individual contract could agree on an appropriate way to accommodate unforeseen conditions making physical settlement impractical, the accommodations would not be uniform across all of those contracts. This would be undesirable, as participants in futures contracts of a particular type should be treated fairly and consistently if a market for such contracts is to function properly.

In some cases, a commodity, futures or other type of exchange can take emergency action that modifies how all existing contracts of a particular type will be settled or otherwise performed. This is also undesirable. Such emergency actions invoke substantial governmental reporting requirements, can undercut market confidence, and can have other detrimental side effects.

SUMMARY

This Summary is provided to introduce a selection of concepts in a simplified form that are further described below in the Detailed Description. This Summary is not intended to identify key or essential features of the invention.

In at least some embodiments, stored data may define a multilaterally-traded contract type and specify final settlement of contracts conforming to the contract type by delivery of a defined quantity of a commodity. Additional data may be received, which additional data may indicate potential invocation of an alternate cash settlement mode for a plurality of contracts. Each contract of the plurality may be a contract conforming to the contract type. Further data may be received, with the further data indicating the alternate cash settlement mode is invoked for a group of contracts. The group may be all of the contracts of the plurality or a subportion of the plurality. Data may be transmitted to indicate cash final settlement of each contract of the group by payment of a cash settlement value instead of by delivery of the defined quantity of the commodity.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Various embodiments may comprise a method, a computer system, and/or a computer program product. Accordingly, one or more aspects of one or more of such embodiments may take the form of an entirely hardware embodiment, an entirely software embodiment and/or an embodiment combining software and hardware aspects. Furthermore, such aspects may take the form of a computer program product stored by one or more non-transitory computer-readable storage media having computer-readable program code, or instructions, embodied in or on the storage media. The term "computer-readable medium" or "computer-readable storage medium" as used herein includes not only a single medium or single type of medium, but also a combination of one or more media and/or types of media. Such a non-transitory computer-readable medium may store computer-readable instructions (e.g., software) and/or computer-readable data (i.e., information that may or may not be executable). Any suitable computer readable media may be utilized, including various types of non-transitory computer readable storage media such as hard disks, CD-ROMs, optical storage devices, magnetic storage devices, and/or any combination thereof.

Aspects of method steps described in connection with one or more embodiments may be executed on one or more processors associated with a computer system (such as exchange computer system 100 described below). As used herein, a "computer system" could be a single computer or could comprise multiple computers. When a computer system comprising multiple computers performs a method, various steps could be performed by different ones of those multiple computers. Processors of a computer system may execute computer-executable instructions stored on non-transitory computer-readable media. Embodiments may also be practiced in a computer system forming a distributed computing environment, with tasks are performed by remote processing devices that are linked through a communications network. In a distributed computing environment, program modules may be located in both local and remote computer storage media including memory storage devices.

Exemplary Operating Environment

Figure 1:
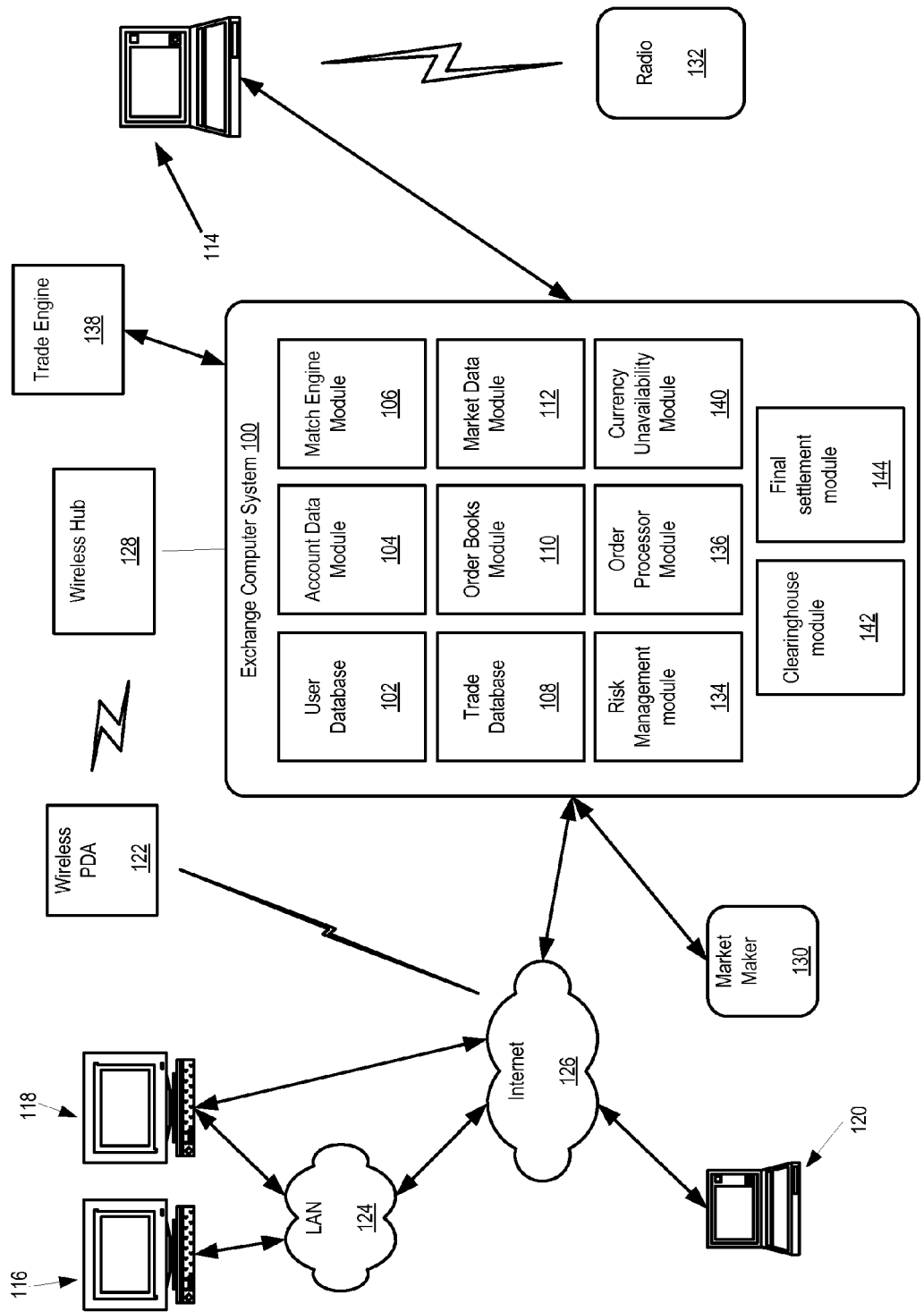
FIG. 1 shows a computer system and network in which one or more aspects of the invention may be implemented.

Aspects of at least some embodiments can be implemented with computer devices and computer networks that allow users to exchange trading information. An exemplary trading network environment for implementing trading systems and methods according to at least some embodiments is shown in FIG. 1. The implemented trading systems and methods can include systems and methods that determine the existence of various currency unavailability conditions and take actions in response. The implemented trading systems and methods can also (or alternately) include systems and methods in which futures contracts specify physical final settlement (e.g., final settlement by delivery of a defined quantity of a commodity), but in which an alternate cash settlement mode can be invoked.

Computer system 100 can be operated by a financial exchange. Computer system 100 receives orders, transmits market data related to orders and trades to users, and performs other operations associated with a financial exchange. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106. A currency unavailability module 140 may be included within exchange computer system 100 for determining whether certain conditions exist with regard to a currency designated for use in satisfying obligations under contracts of a particular type, and for taking appropriate action in those conditions. Those conditions and actions are discussed in more detail below. A final settlement mode module 144 may be included in computer system 100 for use in determining that an alternate cash settlement mode can be invoked, and for taking corresponding actions based on that determination. That determination and corresponding actions are also discussed in more detail below.

A clearinghouse module 142 may be included as part of exchange computer system 100 and configured to carry out clearinghouse operations. Module 142 may receive data from trade database 108 regarding trades of futures contracts and other financial instruments and facilitate the financial exchange acting as one of the parties to every traded contract or other instrument. For example, computer system 100 may match an offer by party A to sell a futures contract for commodity X with a bid by party B to purchase a futures contract for commodity X. Module 142 may then create a first commodity X futures contract between party A and the financial exchange and an offsetting second commodity X futures contracts between the financial exchange and party B. Module 142 may also be configured to perform other clearinghouse operations. As another example, module 142 may maintain margin accounts for member brokers. In those accounts, module 142 may store and maintain data regarding the values of various contracts and other instruments, determine mark-to-market and final settlement amounts, confirm receipt and/or payment of amounts due from margin accounts, confirm satisfaction of final settlement obligations (physical or cash), etc.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

Figure 2:
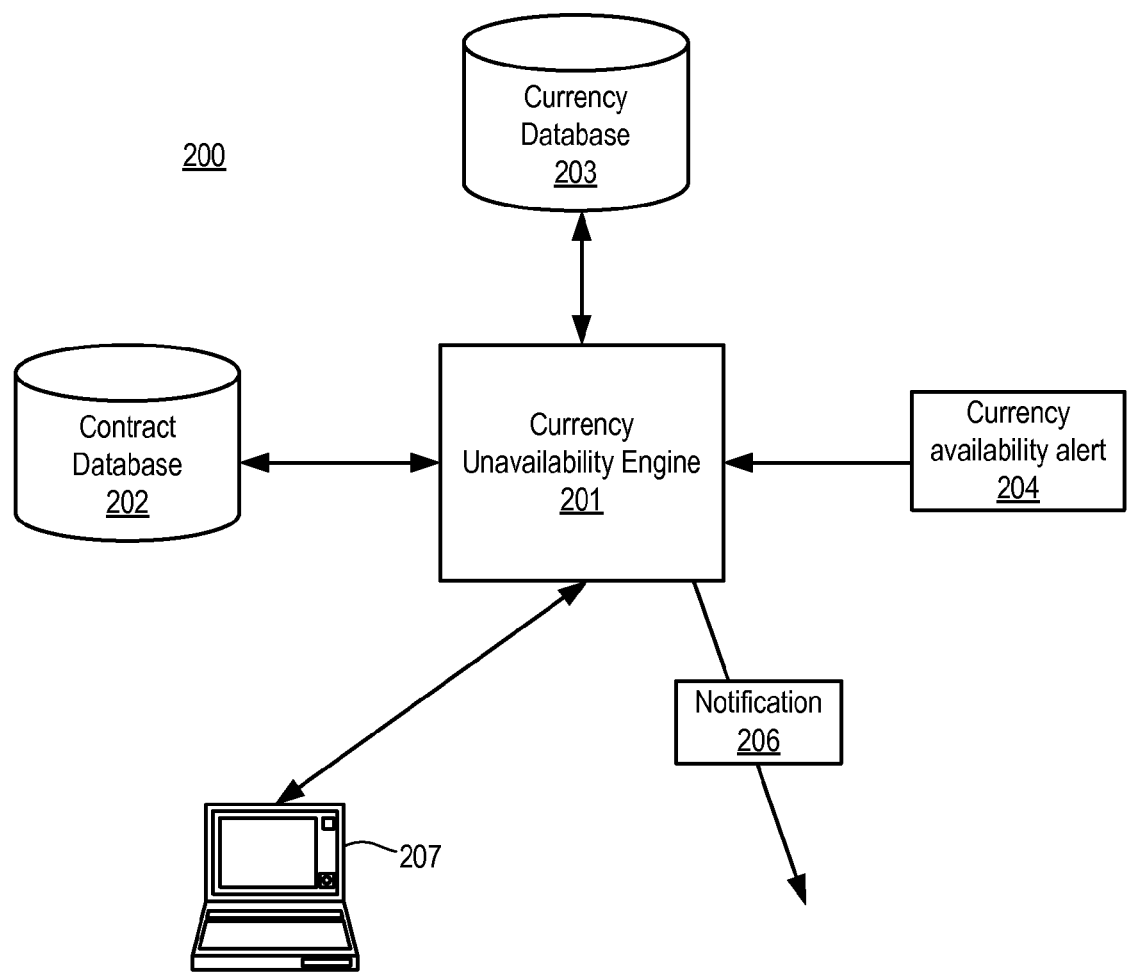
FIG. 2 is a block diagram of a system, according to some embodiments, for use in determining whether a currency unavailability condition exists.

FIG. 2 is a block diagram of a system 200, according to some embodiments, that is configured to determine whether one or more currency unavailability conditions exist and to take certain actions under such conditions. System 200 can be implemented as (or as part of) currency unavailability module 140 (FIG. 1), may be implemented as a standalone computer (or system of computers), or may be implemented as part of another system. Currency unavailability engine 201, which may be implemented in the form of one or more microprocessors executing program instructions, interfaces with one or more futures contracts databases 202. Database 202 maintains information regarding various types of futures contracts and options. For each of multiple futures contract and option types, that data may include designated primary and secondary currencies. A primary currency is a currency designated for use in satisfying obligations under contracts of a particular type. A secondary currency is designated for use in satisfying contract obligations if certain unavailability conditions are determined to exist.

Unavailability engine 201 receives various types of data from contracts database 202. As to each of at least some of the contract types for which information is maintained in database 202, engine 201 receives initialization data that includes general contract terms (e.g., currency or other commodity or other contract subject matter, contract amount, delivery date, designated primary currency, designated secondary currency, etc.). Engine 201 also receives information that identifies the amount of contracts of a particular type that are outstanding. Engine 201 may receive updates from database 202 regarding outstanding contracts on a periodic or other basis. Database 202 may be implemented as a distributed database residing in one or more of the modules of exchange computer system 100 (FIG. 1), may be implemented as a one or more software routines configured to extract data from one or more of said modules, may be implemented as a standalone database accessible over the Internet or other wide area network, or may be implemented in other ways.

Currency unavailability engine 201 also interfaces with one or more currency databases 203. Database 203 stores information regarding the availability of various types of currencies. This information can be compiled using feeds (not shown) from various governmental and financial institutions regarding available quantities of various currencies, exchange rates of various currencies, short- and long-term historical data regarding availabilities and exchange rates for various currencies, etc. As with contract database 202, currency database 203 can be implemented in various ways.

Engine 201 may also receive alerts 204 that include data regarding availability of one or more types of currencies. Alerts 204 may come from any of multiple sources and may contain any of various types of information regarding potential unavailability of a particular currency. As but one example, an alert 204 could be a communication from a third party advising of difficulty in obtaining a particular currency. As another example, an alert 204 could be a communication from a bank or governmental entity advising of limits on currency availability or of changes in currency exchange rates. As a further example, an alert 204 could be automatically transmitted from database 203 based on information accumulated from multiple sources.

Engine 201 outputs notifications 206 that may authorize modification of the manner in which obligations under futures contracts are satisfied. As explained in more detail below, such notifications can include authorization for obligations under a contract of a particular type to be satisfied using the designated secondary currency and using a particular exchange rate for the secondary currency relative to the primary currency.

Engine 201 may also receive other types of input via one or more computers 207. For example, a human user of computer 207 may provide input to engine 201 that configures engine 201 to generate a particular output instruction 206. Such configuration can include specification of various parameters under which engine 201 may automatically determine that a particular currency unavailability condition has occurred. Such configuration could also include an authorization command. For example, engine 201 could be configured to provide a message to computer 207 based on certain criteria that suggest a particular currency may be unavailable. One or more human users of computer 207 could then review that message and any underlying data that caused the message to be sent. If the user(s) determine(s) that an unavailability condition has occurred with regard to the currency in question (e.g., that insufficient amounts of the currency are available, or are available but under generally uneconomic or otherwise onerous conditions per pre-specified criteria), the user(s) could then cause computer 207 to send a message to engine 201 that causes transmission of instruction 206. The message from computer 207 could include details of the manner in which obligations under contracts of a particular type (or types) may be satisfied in an alternative manner, as discussed below. Alert 204 could also be provided via or to computer 207. Computer 207 may be the same computer on which engine 201 executes and/or may also house one or more of databases 202 and 203. Alternatively, any or all of engine 201, database 202 and database 203 could execute or reside on computers separate from computer 207, with computer 207 communicating with those separate computers over one or more local and/or wide area networks.

Figure 3:
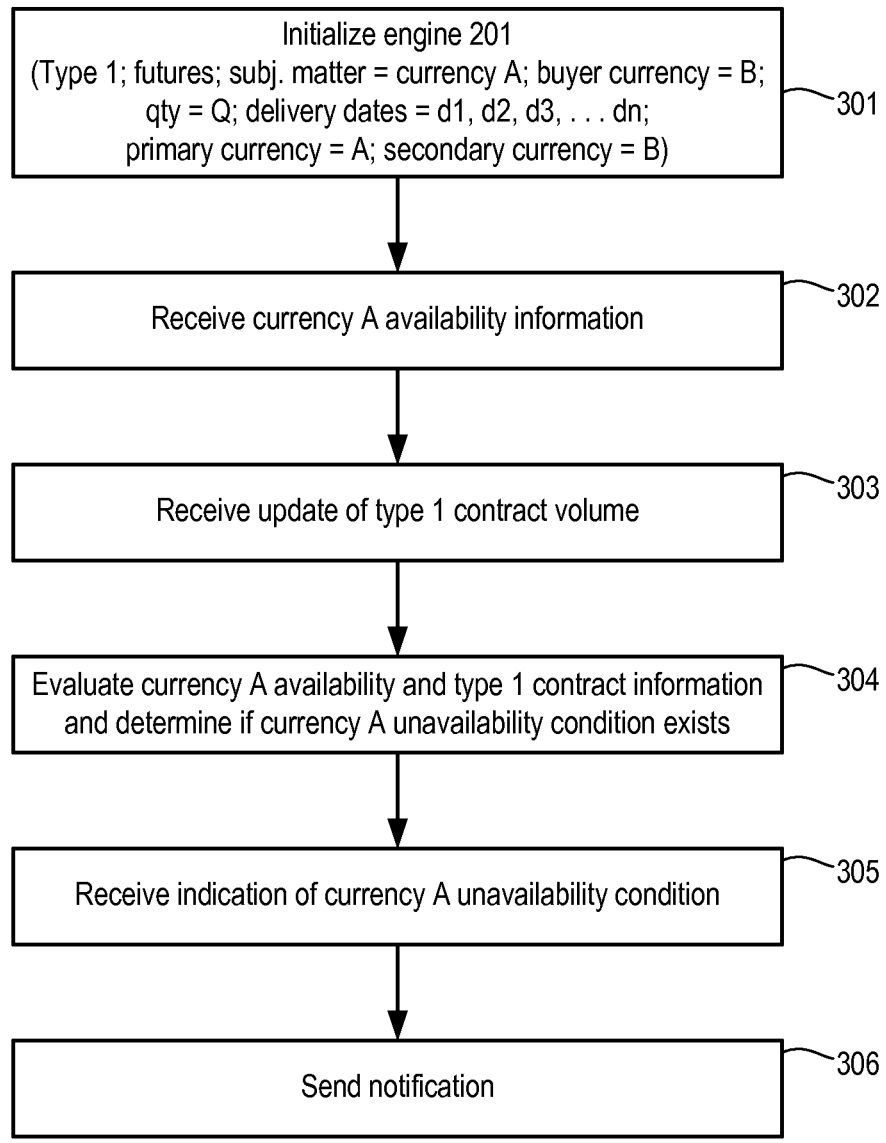
FIGS. 3 and 4 illustrate methods, according to some embodiments, in which a currency unavailability condition is found to exist and in which action is taken as a result.

FIG. 3 is a flow chart showing operations in a method 300 according to some embodiments and that can be performed using system 200. Method 300 is initially described using an example of a hypothetical currency exchange contract type. However, this is solely for purposes of illustration and is no way intended as a limitation on the types of multilaterally-traded contracts for which currency unavailability conditions may be detected and action taken in various embodiments.

In step 301, engine 201 is initialized with regard to a particular futures contract type ("type 1"). This initialization could occur automatically or in response to a human operator's command (e.g., a command from an operator of computer 207). In the present example, a type 1 contract is a futures contract having currency A as the subject matter, a designated quantity (Q) of which is delivered in return for payment of currency B. In other words, each instance of a type 1 contract will obligate a seller to deliver the specified quantity Q of currency A at a specified delivery date for an agreed amount of currency B to be paid by a buyer. The contract size (quantity Q of currency A to be delivered) may be standard for all type 1 contracts. There may be a limited number of possible delivery dates d1 through dn. For example, all type 1 contracts may specify delivery on the 3rd Wednesday of a month, and the longest allowed term of a type 1 contract may be n−1 months. Because the contract price (i.e., the amount of currency B to be paid for the standardized quantity of currency A) may be negotiated between the buyer and seller for each individual instance of a type 1 contract, the contract price may not be part of the initialization information. However, such information might be received in step 303 as part of updates regarding values of type 1 contracts.

The initialization data for type 1 contracts also designates a primary currency and a secondary currency. In the present example, the primary currency is currency A and the secondary currency is currency B. This need not be the case, however. As but one alternative, a contract type could designate a third currency (e.g., currency C) as the secondary currency.

In step 302, engine 201 receives information regarding availability of currency A. This information may be received from database 202, from one or more alerts 204, and/or from other sources. The availability information may provide an estimate of the quantity of currency A available on the world, or in a specified local, market, the current exchange rates for and amount of currency A available from each of multiple sources, interest rates for borrowing currency A, forecasts of availability and/or exchange rates for currency A in upcoming time periods, etc. As with step 301, step 302 could occur automatically or in response to a command resulting from input by a human operator into computer 207. For example, an operator of computer 207 may receive one or more indications from separate sources of potential unavailability or recent exchange rate spikes with regard to currency A. Based on such indications, the operator of computer 207 could provide input causing engine 201 to retrieve currency A information from database 203.

In step 303, engine 201 receives an update from database 202 indicating the volume of type 1 contracts outstanding. For example, this update may indicate the total number of outstanding type 1 contracts scheduled for delivery on each of the next delivery dates throughout the next N months, where N is the longest term type 1 contract available. As indicated above, the update could also include information regarding values of outstanding type 1 contracts, e.g., the contracted amount in each contract that the buyer has agreed to pay for the quantity Q of currency A.

As with steps 301 and 302, updating of engine 201 in step 303 could occur in response to a command resulting from input by a human operator into computer 207. Step 303 could also occur automatically. As one example, engine 201 could be configured to automatically retrieve information regarding outstanding type 1 contracts if there are certain triggers in the currency A data received in step 302. Such triggers could include information indicating events consistent with unavailability of currency A, e.g., receipt of an alert 204 (or receipt of a predetermined number of alerts 204), a rise of the average currency A exchange rate by more than a predetermined percentage of its current value or by more than some other amount, a drop in the estimated worldwide supply of currency A below a certain level, an increase in currency A lending rates beyond a particular level or amount, a news report regarding events in the country issuing currency A, etc. As another example, engine 201 could be configured to periodically download updates from information database 202 regardless of whether there are triggers in the data received in step 302.

In step 304, the information regarding currency A and regarding type 1 contracts is evaluated. Based on that evaluation, a determination is made regarding whether an unavailability condition has occurred with regard to currency A. This determination could be made automatically by engine 201. For example, engine 201 could be configured to compare an estimated amount of currency A available on the world market with the volume of type 1 contracts that will become due in the next month (or in the next several months). If the estimated supply of currency A is less than a predefined multiple of the type 1 contract volume, an unavailability condition could be deemed to occur. As another alternative, an average current exchange rate for currency A could be compared to exchange rates in preceding periods. If the current average exchange rate exceeds a value calculated from one or more previous period exchange rates by a certain amount, an unavailability condition could be declared.

Step 304 could also include a human decision (e.g., by an official of an exchange operating system 100) regarding whether an unavailability condition for currency A has occurred. This decision could be based on objective or subjective criteria. As part of this decision process, information regarding type 1 contracts and currency A availability that was received at engine 201 is also received at computer 207. As engine 201 receives information during steps 301-303 in some embodiments, for example, engine 201 may forward that information to computer 207. That forwarded information can then be output by computer 207 and used by one or more persons to determine if an unavailability condition exists.

In some embodiments, engine 201 may automatically receive (or retrieve) information in steps 301-303, but only send that information to computer 207 under certain circumstances. For example, engine 201 could be configured to transmit a message to computer 207 in response to, and alerting a computer 207 user of, certain events that are consistent with unavailability of currency A. Such events could include receipt of an alert 204 (or receipt of a predetermined number of alerts 204), a rise of the average currency A exchange rate above some level, a drop in the estimated worldwide supply of currency A below a certain level, an increase in currency A lending rates beyond a particular level or amount, a news report regarding events in the country issuing currency A, etc.

If it is determined in step 304 that a currency A unavailability condition does not exist, the method could conclude. In the example of FIG. 3, however, a currency A unavailability condition is found to exist. Accordingly, in step 305 engine 201 receives an indication of that currency A unavailability condition. If the determination of step 304 was made automatically within engine 201, the indication could be the output of that automatic determination. If the determination in step 304 was made by a human, the indication could be a signal received from computer 207, which signal may be sent as a result of computer 207 receiving an indication from a human user that an unavailablity condition exists.

In step 306, engine 201 sends notification 206 to one or more of the elements of exchange computer system 100 and/or otherwise disseminates notification 206 to market participants. The content of notification 206 can be preconfigured or could be determined in some other manner. For example, an operator of computer 207 could provide some or all of the notice 206 content when providing an indication of the currency A unavailability condition to engine 201 in step 305.

The content of notification 206 can vary. Notification 206 could include an instruction that, until further notice, all type 1 contracts may or must be settled using an amount of currency B equivalent to the contract size (quantity Q in the present example) of currency A, and may further include an exchange rate to be used in calculating that equivalent amount of currency B. Notification 206 might also indicate that other payments associated with type 1 contracts could be made using equivalent amounts of currency B. In some cases, e.g., if the currency A unavailability condition is believed to be short-term, notification 206 might only authorize currency B equivalency payments for type 1 contracts that mature (e.g., that have delivery dates) in the next period or in the next few periods.

In some cases, it might be determined in step 304 that a currency A unavailability condition has occurred, but that there is a sufficient supply of currency A to permit some type 1 contract settlements and/or payments to be made using currency A. Accordingly, notification A could further include information indicating a portion of type 1 contract payments for which currency A is to be used and a portion of type 1 contract payments for which an equivalent amount of currency B is to be used. An allocation between currency A payments and currency B equivalency payments could be implemented in multiple ways. For example, and as indicated above, currency B equivalency payments might only be authorized for older type 1 contracts with near-term delivery dates. As another example, currency B equivalency payments might only be authorized for a randomly selected subset of all type 1 contracts. As yet another example, currency B equivalency payments might only be authorized for a portion of payments due under each type 1 contract (e.g., require each type 1 contract to be settled 50% by currency A delivery and 50% by currency B equivalency payments). As but another example, currency B equivalency payments might only be authorized for parties holding more than a certain amount of type 1 contracts.

For simplicity, embodiments have thus far been described using an example of a single type of futures contract. Other embodiments may operate in connection with more generalized and more complicated circumstances. Instead of a single type of futures contract for currency A, there could be multiple additional types: a type 2 contract requiring delivery of currency A for payment of currency C, a type 3 contract requiring delivery of currency A for payment of currency D, etc. There could also be numerous other types of contracts that designate currency A as a primary currency, but which require delivery of a commodity other than currency A (e.g., a futures contract for an agricultural or industrial commodity that requires cash settlement in currency A). There might also be various options for any of the futures contract types that designate currency A as a primary currency. And of course, all of these other contract and option types might exist in a market where there are a large number of futures contract types that do not designate currency A as primary (and/or that may not implicate currency A in any way).

Figure 4:
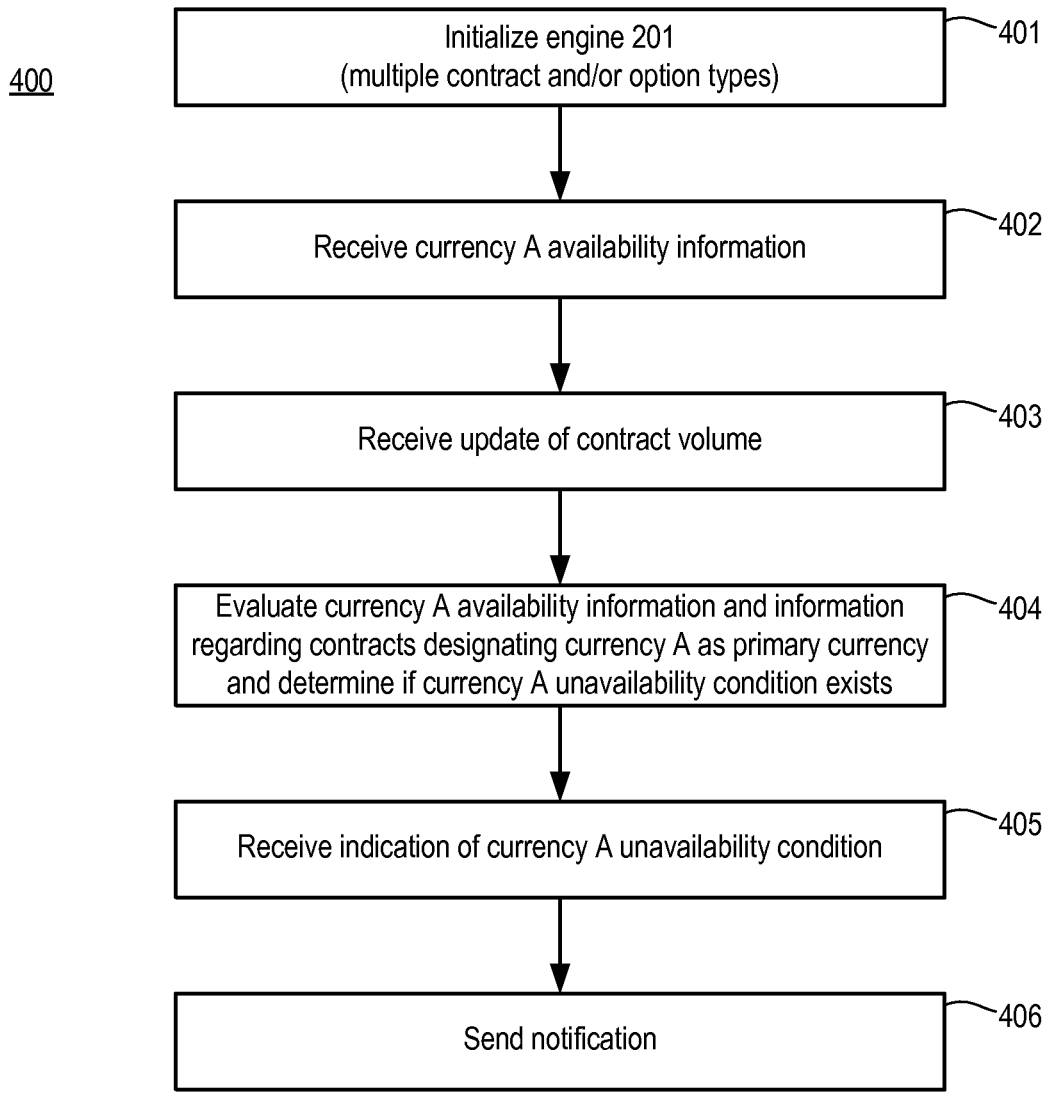

FIG. 4 is a flow chart showing operations in a method 400 according to some embodiments. Method 400 can also be performed using system 200 and is similar to method 300 of FIG. 3. However, method 400 assumes the existence of numerous types of contracts and options that designate currency A as the primary currency, as well as numerous other types of contracts and options that do not designate (and/or do not implicate) currency A.

In step 401, engine 201 is initialized with regard to, and provided with data regarding, the multiple types contracts and options that designate currency A as a primary currency. Although many of those contract types also designate a secondary currency, some may designate currency B as secondary, some may designate currency C as secondary, some may designate currency D as secondary, etc. In step 1, engine 201 is also initialized with regard to (and provided data regarding) numerous other types of contracts and options that do not implicate currency A.

In step 402, engine 201 receives information regarding availability of currency A. During step 402, however, engine 201 might also receive information regarding other currencies. Engine 201 could receive information in step 402 any of the ways described in connection with step 302 of FIG. 3.

In step 403, engine 201 receives one or more updates from database 202 indicating the volume of all types of contracts and options for which currency A is designated as the primary currency. During step 403, however, engine 201 might also receive one or more updates from database 202 indicating the volume for types of contracts and options that do not implicate currency A. Engine 201 could receive updates in step 403 any of the ways described in connection with step 303 of FIG. 3.

In step 404, the information regarding currency A and the information regarding all contracts and options that designate currency A as primary currency contracts is evaluated. Based on that evaluation, a determination is made regarding whether an unavailability condition has occurred with regard to currency A. This determination can be made automatically by engine 201 or with human involvement in ways similar to those described in connection with step 304 of FIG. 3.

In the example of FIG. 4, a currency A unavailability condition is found to exist. Accordingly, in step 405 engine 201 receives an indication of that currency A unavailability condition. This indication can be received in ways similar to those described in connection with step 305 of FIG. 3.

In step 406, engine 201 sends notification 206 to one or more of the elements of exchange computer system 100 and/or otherwise disseminates notification 206 to market participants. The content of notification 206, which can be set in ways similar to those discussed in connection with FIG. 3, can also vary in ways similar to those described in connection with FIG. 3. For example, notification 206 could include an instruction that, until further notice, all contracts designating currency A as the primary currency may be settled (and/or other obligations under such contracts paid) using an amount of the designated secondary currency equivalent to the contract amount, and may further include exchange rates to be used in calculating equivalent amounts of the secondary currencies. As another example, notification 206 might only authorize secondary currency equivalency payments for contracts that designate currency A as the primary currency and that mature in the next period or in the next few periods. Any of the currency A/currency B allocation techniques previously described could also be used to allocate between currency A payments and payment in an equivalent amount of a designated secondary currency.

Figure 5:
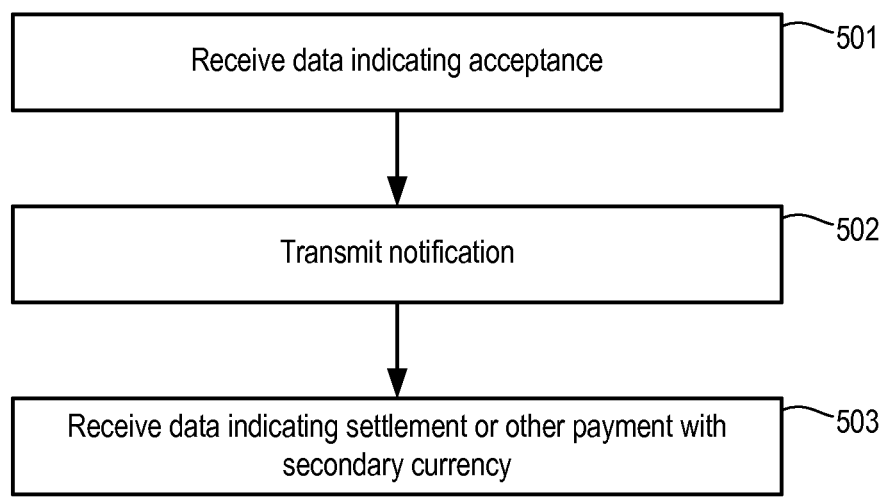
FIG. 5 illustrates a method, according to some embodiments, that may be performed in connection with a futures contract or other multi-laterally traded and/or cleared contract that designates primary and secondary currencies.

FIG. 5 is a flow chart showing steps that may be performed in connection with a futures contract or other multi-laterally traded and/or cleared contract that designates primary and secondary currencies. The steps shown in FIG. 5 could be performed in the system of FIG. 1 as operations resulting from execution of computer-readable instructions. Beginning in step 501, exchange computer system 100 receives data indicating acceptance of an offer (or bid) for a futures contract that designates primary and secondary currencies. At a later date, and as shown in step 502, a notification authorizing settlement or other payment in an equivalent amount of the designated secondary currency is transmitted. In step 503, data regarding the contract is received, which data indicates that settlement or other payment has been made with an equivalent amount of the secondary currency instead of with the primary currency.

As another more specific example, futures contracts could designate Chinese Renminbi or Yuan (RMB or CNY) as the primary currency and the U.S. dollar (USD) as the secondary currency. Historically, RMB (or CNY) has not been freely convertible to other currencies. In response to the increasing global economic significance of the People's Republic of China, however, the People's Bank of China (PBC) has taken steps to liberalize use of RMB in offshore locations such as Hong Kong. An offshore market in RMB, known as the CNH market, is rapidly growing. The PBC has also announced intentions to allow U.S. entities to transact in RMB. Currently, futures in RMB are quoted in "American terms," or USD per RMB. However, new types of RMB futures contracts could be quoted in "European terms," or RMB per USD. These new contracts could be cash-settled at the RMB per USD fixing rate published by PBC at 9:15 a.m. (Beijing time) and currently published by Reuters SAEC page opposite "USDCNY=". Although these new contracts could employ a cash settlement, the contracts could alternately provide for a physical delivery of RMB vs. USD, facilitated through an exchange-designated settlement bank.

Currently, however, offshore CNH is not fully convertible with onshore RMB. Accordingly, these new contract types could, similar to contract types discussed in connection with description of other embodiments, utilize procedures in the event that RMB is not available to support RMB-denominated daily mark-to-market payments, RMB-denominated final mark-to-market payments for cash-settled contracts, or physical delivery of RMB. If circumstances are such that one or more clearing members of an exchange is required to make RMB-denominated payments but is unable to do so because of circumstances beyond that member's control, the exchange may authorize satisfaction of such required payments in USD. The amount of USD to be paid could be determined by the amount of RMB due converted into USD by reference to a current RMB per USD rate. The exchange could have sole discretion to authorize payment in USD instead of RMB under circumstances that could include illiquidity in the offshore RMB market, inconvertibility of RMB, non-transferability of RMB, etc. One of these new type contracts could include a "standard" sized futures contract (or an option on futures) nominally based on USD 100,000 and quoted in minimum increments of 0.0010 RMB per USD=100 RMB. Another of these new type contracts could include a "micro" sized futures contract (or an option on futures) nominally based on USD 10,000 and quoted in minimum increments of 0.0010 RMB per USD=10 RMB.

Embodiments described herein can be combined with embodiments described in the aforementioned commonly-owned application titled "Interest Accrual Provisions for Multi-Laterally Traded Contracts."

Figure 6:
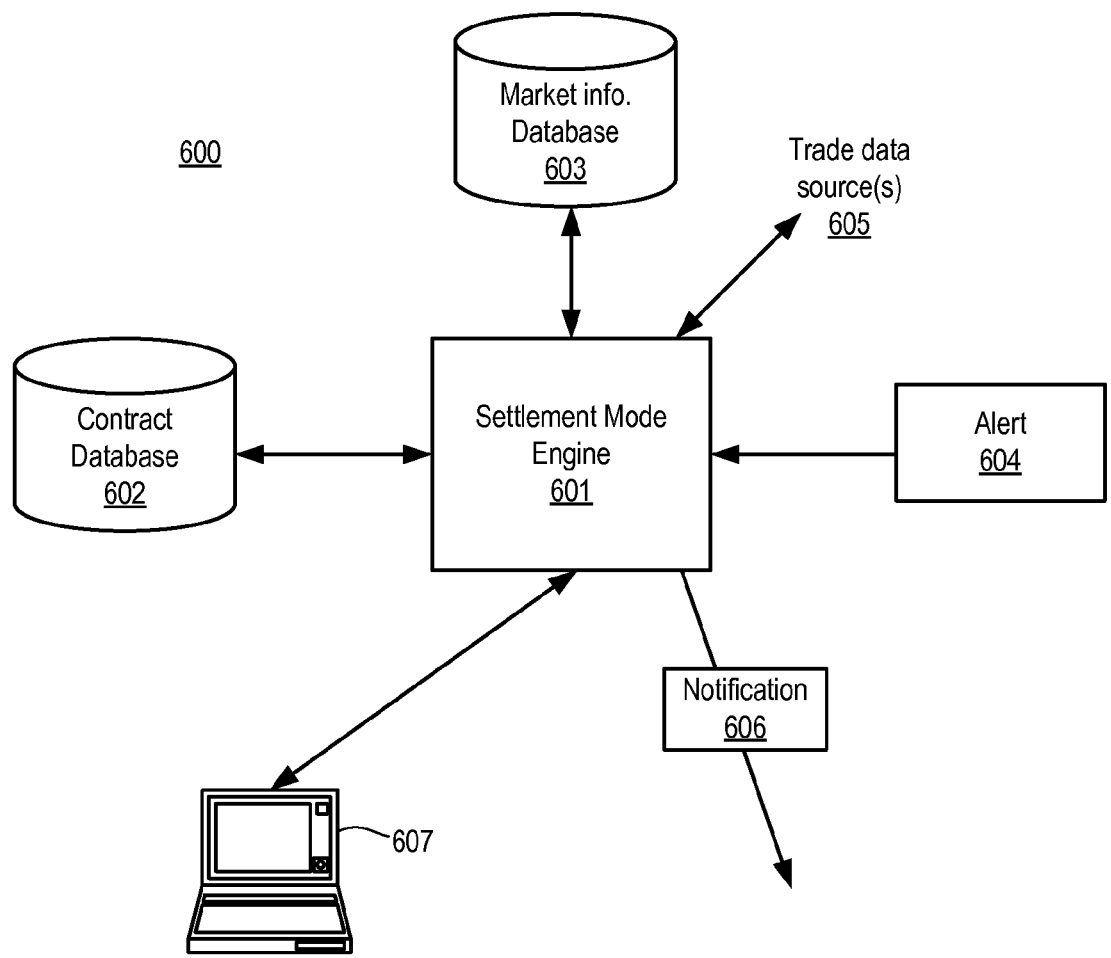
FIG. 6 is a block diagram of a system, according to some embodiments, configured to perform various operations in connection with invoking (or not invoking) an alternate cash settlement mode.

FIG. 6 is a block diagram of a system 600, according to some embodiments, that is configured to perform various operations in connection with invoking or not invoking an alternate cash settlement mode for one or more groups of futures contracts. System 600 may be final settlement mode module 144 (FIG. 1), may be implemented as a standalone computer (or computer system), or may be implemented as part of another system. Settlement mode engine 601, which may be implemented in the form of one or more microprocessors executing program instructions, interfaces with one or more futures contracts databases 602. Database 602 maintains information regarding various types of futures contracts and other derivatives. The data stored in database 602 may include data defining each of numerous multi-laterally traded futures contract types. For each defined contract type, the data in database 602 may define some or all of the following characteristics of all contracts of that type: commodity that is the subject of the contract, the contract quantity of the commodity, maturity date, how physical settlement is to be performed, whether an alternate cash settlement mode can be invoked, the parameters under which an alternate cash settlement mode can be invoked, and how an alternate cash settlement mode can be implemented. Data regarding implementation of an alternate cash settlement mode may further include data regarding how an alternate cash settlement value is to be determined.

Settlement mode engine 601 receives various types of data from contracts database 602. As to each of at least some of the contract types for which information is maintained in database 602, engine 601 receives initialization data that includes general contract terms (e.g., commodity that is the contract subject matter, contract amount, delivery date, etc.). Engine 601 also receives information that identifies the amount of contracts of a particular type that are outstanding. Engine 601 may receive updates from database 602 regarding outstanding contracts on a periodic or other basis. Database 602 may be implemented as a distributed database residing in one or more of the modules of exchange computer system 100 (FIG. 1), may be implemented as a one or more software routines configured to extract data from one or more of said modules, may be implemented as a standalone database accessible over the Internet or other wide area network, or may be implemented in other ways.

Settlement mode engine 601 also interfaces with one or more market data databases 603. Database 603 stores information regarding the availability of various types of commodities and may be consulted by engine 601 to, e.g., confirm whether market conditions warrant invocation of an alternate cash settlement mode as to a particular group of contracts. Data in database 603 could include information regarding worldwide and regional supplies of various commodities, status information regarding facilities used for physical delivery, industry information and news reports relating to various commodities, etc. Database 603 could be a part of exchange computer system 100 and/or could comprise links to one or more external databases and/or market information services.

Engine 601 may also have one or more communication links to trade data sources 605. As explained in more detail below, engine 601 may obtain trade data from sources 605 as part of calculating an alternate cash settlement price. Trade data sources 605 may comprise one or more internal or external databases that provide bid and ask prices for commodities over time periods of interest. Trade data sources 605 could also include email communication links to brokers and/or other entities that perform trading operations.

Engine 601 may also receive alerts 604 that include data indicating potential invocation of an alternate cash settlement mode as to certain contracts. Alerts 604 may come from any of multiple sources and may contain any of various types of information regarding potential unavailability of a particular commodity or other information regarding difficulties in delivering and/or taking delivery of a particular commodity. As but one example, an alert could be a communication from a futures contract counterparty advising that, because of circumstances beyond that counterparty's control, delivery (or taking delivery) of a particular commodity will be impossible or will be impractical under reasonable commercial terms or conditions. As another example, an alert could be a request from a futures contract counterparty requesting invocation of alternate cash settlement under the terms of the contract. As but another example, an alert could be from a source other than a contract counterparty (e.g., a governmental entity, a news service, a trade organization) and could indicate that conditions are such that delivery (or taking delivery) of a particular commodity will be difficult for counterparties to a large number of contracts.

Engine 601 outputs notifications 606 that may authorize cash settlement of one or more groups of futures contracts. As explained in more detail below, such notifications can include authorization for obligations under a contract of a particular type to be satisfied by payment of an alternate cash settlement value. Some notifications 606 could advise that alternate cash settlement is not authorized.

Engine 601 may also receive other types of input via one or more computers 607. For example, a human user of computer 607 may provide input to engine 601 that configures engine 601 to generate a particular notification 606. Such configuration could include an authorization command. For example, engine 601 could be configured to provide a message to computer 607 based on certain criteria (e.g., receipt of one or more alerts 604) that suggest physical settlement of a class of contracts may be commercially impractical or impossible. One or more human users of computer 607 could then review that message and any underlying data that caused the message to be sent. If the user(s) determine(s) that invocation of an alternate cash settlement mode is appropriate, the user(s) could then cause computer 607 to send a message to engine 601 that causes transmission of one or more instructions 606. The message from computer 607 could include details of the manner in which obligations under contracts of a particular type (or types) may be finally cash settled, and/or may include instructions to engine 601 to obtain recent trade data (e.g., from sources 605) and/or to calculate an alternate cash settlement value to be included in a notification 606. The message from computer 607 could alternately include a request for additional information. For example, computer 606 could instruct engine 601 to seek additional information from database 603 so as to confirm appropriateness of invoking a cash settlement mode. As another example, computer 607 could instruction engine 601 to obtain data regarding recent bid and ask prices for a commodity and to return that data to computer 607 for use in calculating an alternate cash settlement value.

An alert 604 might also be provided via or to computer 607. Computer 607 may be the same computer on which engine 601 executes and/or may also house one or more of databases 602 and 603. Alternatively, any or all of engine 601, database 602 and database 603 could execute or reside on computers separate from computer 607, with computer 607 communicating with those separate computers over one or more local and/or wide area networks.

Figure 7:
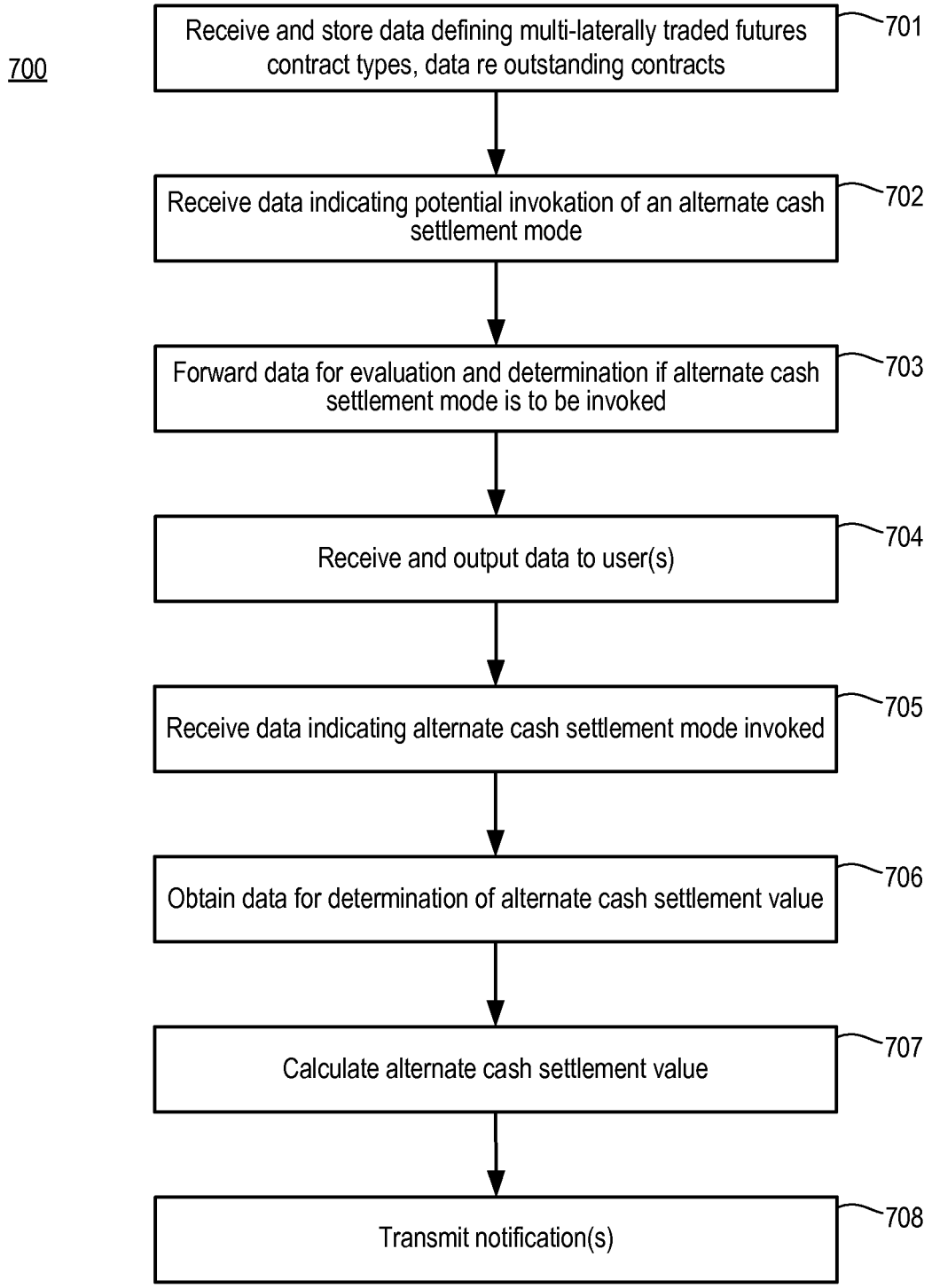
FIGS. 7 and 8 illustrate methods, according to some embodiments, in which an alternate cash settlement mode might be invoked.

FIG. 7 is a flow chart showing a method 700 according to some embodiments that can be performed using system 600. In step 701, system 600 receives and stores data defining each of a plurality of multi-laterally traded futures contracts. This data, which can be stored in database 602 and accessible by engine 601, defines terms of each of a plurality of contract types. For each contract type, those terms can include maturity date (e.g., date of final settlement), contract subject matter (e.g., the commodity to be delivered), contract quantity of subject matter to be delivered, etc.

The defined terms of each contract type can also include an indication of whether an alternate cash settlement mode can be invoked for contracts of a particular type, and if so, the parameters by which that alternate cash settlement mode is implemented. Those parameters can include a specification of the manner in which an alternate cash settlement value is to be calculated. Calculation of alternate cash settlement value is described below in connection with step 707. The alternate cash settlement mode parameters may specify the circumstances under which an alternate cash settlement mode can be invoked. As described below in connection with step 705, such invocation may occur upon approval by one or more human users of system 700 after receipt of data (e.g., alerts 604).

As indicated above, and as part of step 701, database 602 may also receive and store data regarding the number of outstanding contracts of each type, contracts prices of those outstanding contracts (i.e., the price the long counterparty has agreed to pay at final settlement), the identity of holders of those outstanding contracts, etc. At any given time, there may be hundreds or thousands of outstanding contracts of a particular contract type.

The receiving and storing operations of step 701 could occur over a prolonged period of time (e.g., months, weeks or years, depending the term of the contract type(s) at issue). Moreover, multiple separate instances of method 700 could be performed concurrently, e.g., system 600 could carry out separate instances of method 700 for each contract type and/or for sets of various contract types. For example, a separate instance of method 700 could be carried out for multiple contract types having a common maturity date.

In step 702, engine 601 receives alerts 604 indicating potential invocation of an alternate cash settlement mode for contracts of a particular contract type (hereinafter, the "type in question"). As indicated above, those alerts can be communications from (or on behalf of) long or short contract counterparties advising of difficulties in effecting physical settlement. Those communications could include information regarding marketwide unavailability of a commodity. Those communications could include information regarding conditions that make delivery or accepting delivery impractical. For example, credit conditions may be such that operators of private facilities (e.g., crude oil terminals, grain elevators) are preventing counterparties from making or taking delivery. As another example, an accident or natural disaster may have made delivery or taking delivery at certain facilities impossible, and delivery or taking delivery at other facilities may not be commercially reasonable for a significant group of counterparties.

In step 703, engine 701 forwards data received in step 702 for evaluation and determination if an alternate cash settlement mode is to be invoked for contracts of the type in question. In some embodiments, all information received in step 702 is forwarded. In other embodiments, engine 701 may apply thresholds and/or filters to accumulated alerts 604 before forwarding data for evaluation and determination if an alternate cash settlement mode is to be invoked. Engine 601 could also be configured to extract relevant market data from database 603 and forward same for use in confirming data from received alerts 604 and/or for otherwise assisting in determination of whether to invoke an alternate cash settlement mode. Data forwarded in step 703 could also include data regarding the number and value of outstanding contracts of the type in question, the identities of counterparties, etc.

In step 704, data forwarded by engine 601 in step 703 is received at computer 607 (or at multiple computers 607) and output to user(s) of computer(s) 607. The output may include one or more user interfaces by which the user(s) can cause engine 601 to request and provide additional information, from database 603 and/or from other sources, for use in confirming and/or otherwise evaluating information from alerts 604.

In step 705, computer(s) 607 receive input from one or more users (e.g., approval(s) from one or more officials of the exchange operating computer system 100) indicating that an alternate cash settlement mode will be invoked for contracts of the type in question. In response, and as shown in step 706, engine 601 and/or user(s) of computer(s) 607 obtain data from trade data sources 605 for use in determining the alternate cash settlement price. The type of data obtained in step 706 may depend on the contract type definition, discussed in connection with step 701, for the contract type in question. In some cases, an alternate cash settlement price is determined based on spot market bid and ask prices for the contract commodity during a specified time period. For example, a contract type definition for a crude oil futures contract may specify that bid and ask prices should be sampled in during two or more randomly selected ten-minute intervals within a two hour trading window (e.g., the two hour trading window immediately following or immediately preceding the time at which the input of step 705 is received). As another example, a contract type definition for a currency futures contract may specify that bid and ask prices should be sampled during two or more randomly selected five-minute intervals within a half hour trading window (e.g., the half hour trading window immediately following or immediately preceding the time at which the input of step 705 is received).

In step 707, the information obtained in step 706 is then processed by engine 601, in accordance with the definition data of the contract type in question, to calculate the alternate cash settlement price. In at least some embodiments, a pre-designated number of the highest and lowest sampled bid and ask values are discarded (e.g., discard the highest ask price and the lowest bid price, discard the two highest ask prices and the two lowest bid prices, etc.). The remaining non-discarded sample values may then be averaged or otherwise processed (e.g., the median or other statistical value calculated) to yield the alternate cash settlement price.

In step 708, engine 601 transmits one or more notifications 606 indicating alternate cash settlement of contracts of the type in question by payment of the calculated alternate cash settlement value. In some cases, those notifications may require cash settlement of all outstanding contracts of the type in question. In other cases, those notifications may only require cash settlement of a sub-portion of all outstanding contracts of the type in question. In still other cases, those notifications may authorize (but not require) cash settlement of some or all outstanding contracts of the type in question. For example, the notifications could indicate that contracts of the type in question can be settled in cash or may be physically settled in a specific manner. As one illustration thereof, the type definition of the contracts in question may have specified physical delivery at any of facilities A, B, C, D or E. The notifications 607 might specify that contracts of the type in question can be settled in cash by payment of the alternate cash settlement value or may be physically settled by delivery at facilities A and C.

In connection with notifications 607, engine 601 may also send data to one or more other elements of exchange computer system 100 (e.g., clearinghouse module 142) regarding the contracts for which an alternate cash settlement will be permitted. In response, clearinghouse module 142 and/or other elements of system 100 may update accounts of counterparties to those contracts. In particular, those accounts may be updated to reflect that final settlement obligations can be fulfilled by cash settlement instead of by physical settlement, and to reflect the alternate cash settlement value. Although not shown in FIG. 7, clearinghouse module 142 and/or other elements of computer system 100 may subsequently receive and store data indicating satisfaction of such alternate cash settlement obligations.

Figure 8:
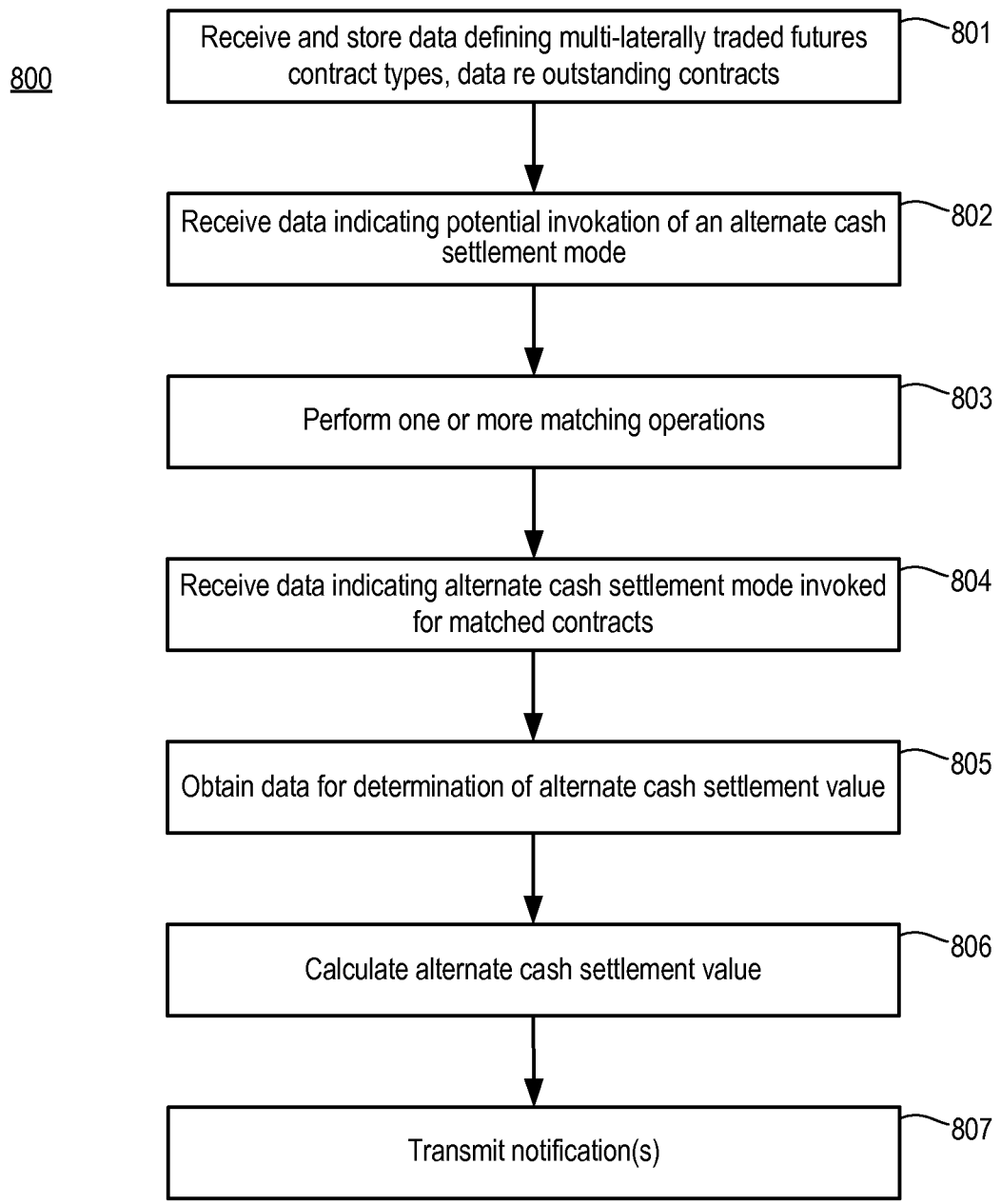

FIG. 8 is a flow chart showing a method 800 according to some embodiments that can be performed using system 600. Step 801 is similar to step 701 of method 700. In method 800, however, the received and stored contract type data may also include data for a contract type (and for contracts of that type) in which alternate cash settlement can be invoked if sufficient numbers of long and short counterparties request alternate cash settlement. In particular, that contract type definition may indicate that long or short counterparties can request invocation of alternate cash settlement without regard to the possibility or practicality of physical settlement. For each contract of a requesting short counterparty that can be "matched" to a corresponding contract of a requesting long counterparty, the short counterparty will be allowed to make an alternate cash settlement at contract maturity. For each contract of a requesting long counterparty that can be "matched" to a corresponding contract of a requesting short counterparty, the long counterparty will be allowed to receive an alternate cash settlement at contract maturity. As used in connection with method 800, matching short and long counterparties comprises determining, for each contract of a long counterparty desiring alternate cash settlement, that there is a corresponding contract of a short counterparty also desiring alternate cash settlement. The counterparties to the "matched" contracts need not be (and likely would not be) identified to one another. The contract type definition may also include data, similar to that described in connection with method 700, specifying how the alternate cash settlement value will be calculated. The type definition may also include data specifying how contracts of requesting short counterparties are matched to contracts requesting long counterparties (or vice versa), as discussed in further detail below.

In step 802, and similar to step 801, engine 601 receives alerts 604 indicating potential invocation of an alternate cash settlement mode for contracts of a particular contract type (hereinafter, the "type under consideration"). In step 802, those indications include requests from long and short counterparties indicating a willingness make or receive final settlement in cash.

In step 803, engine 601 performs one or more matching operations and identifies contracts of requesting long counterparties that correspond to contracts of requesting short counterparties. If there are more contracts of requesting long counterparties than contracts of requesting short counterparties (or vice versa), engine 601 further determines which contracts will be finally settled in cash and which will be physically finally settled. Engine 601 can make this determination in any of various manners. In some embodiments, this determination can be made on a first-come-first serve basis. In some embodiments, a random selection can be made among the counterparty side (i.e., the requesting longs or the requesting shorts) that has more than the other side (i.e., the other of the requesting longs or the requesting shorts). In still other embodiments, this determination could include apportionment of cash settlement authorization based on the size of various counterparties' positions in contracts of the type under consideration. Combinations of these and other determination techniques could be employed. In step 804, engine 601 receives data form one or more subroutines and/or external sources indicating that an alternate cash mode is invoked for the matched contracts.

In step 805, and similar to step 706 of method 700, engine 601 and/or user(s) of computer(s) 607 obtain data from trade data sources 605 for use in determining the alternate cash settlement value. In step 806, and similar to step 707 of method 700, the information obtained in step 804 is then processed by engine 601, in accordance with the definition data of the contract type under consideration, to calculate the alternate cash settlement value. In step 807, and similar to step 708 of method 700, engine 601 transmits one or more notifications 606 indicating alternate cash settlement of contracts of the type in question for payment of the calculated alternate cash settlement value. Those notifications may also include notifications, to requesting counterparties of unmatched contracts, that alternate cash settlement is not authorized.

As with method 700, and in connection notifications 607 transmitted in step 807, engine 601 may also send data to clearinghouse module 142 and/or other exchange computer 100 elements regarding the contracts for which an alternate cash settlement will be permitted. In response, clearinghouse module 142 and/or other elements of system 100 may update accounts of counterparties to those contracts to reflect that final settlement obligations can be fulfilled by cash settlement instead of by physical settlement, and to reflect the alternate cash settlement value. Clearinghouse module 142 and/or other elements of computer system 100 may subsequently receive and store data indicating satisfaction of such alternate cash settlement obligations.

The methods and systems described in connection with FIGS. 6-8 can be implemented with regard to any of various types of futures contracts. Such contracts can relate to any type of agricultural, energy, metal, currency (e.g., foreign exchange), interest rate, equity or other type of commodity. The commodity can be tangible or intangible.

For example, one type of futures contract may require the short counterparty to deliver a contract quantity of transferable governmental benefits, in return of payment of the contract price, on the delivery date. As a further example, a governmental entity may impose a limit on the amount of carbon dioxide or other carbon-containing gases that a corporation can release into the atmosphere during a particular period. In effect, the corporation could be given a certain amount of "credits" that correspond to the allowable carbon it can output. If the corporation exceeds its allowed carbon output (i.e., it does not have sufficient credits to cover its entire output), it is subject to a fine. However, that government program may allow corporations to trade or sell their carbon credits to other corporations. Thus, corporation X may have N carbon credits but may output less than N credits' worth of carbon in an applicable period. Corporation Y may also have N carbon credits but may output more than N credits' worth of carbon in an applicable period. Corporation X could sell or otherwise trade its unused credits to corporation Y and allow corporation Y to mitigate or avoid a fine.

Under various circumstances, physical settlement of a futures contract based on carbon credits or other transferable governmental benefit could become impossible or highly impractical. For example, the applicable governmental program could be canceled or significantly modified while numerous such contracts are outstanding, thereby preventing short counterparties from delivering the governmental credit or other benefit. Under such circumstances, an alternate cash settlement could be invoked. In the case of a carbon credit futures contracts, an alternate cash value could be based, e.g., on the amount of governmental fine that corresponds to an "uncredited" carbon emission. Alternate cash settlement values for other futures contracts based on other transferable governmental benefits might similarly be based on the amount of costs likely to be incurred in the absence delivery of the benefit. Alternate cash settlement values could also be calculated in other ways.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. For example, one of ordinary skill in the art will appreciate that the steps illustrated in the illustrative figures may be performed in other than the recited order, and that one or more steps illustrated may be optional in one or more embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A method comprising:
   storing first data at a computer system, the first data defining a multilaterally-traded contract type and specifying final settlement of contracts conforming to the contract type by delivery of a defined quantity of a commodity;
   receiving second data at the computer system, the second data indicating potential invocation of an alternate cash settlement mode for a plurality of contracts, wherein each contract of the plurality is a contract conforming to the contract type;
   receiving third data at the computer system, the third data indicating the alternate cash settlement mode is invoked for a group of contracts, wherein the group is at least a portion of the contracts of the plurality;
   calculating a cash settlement value by the computer system, wherein calculating the cash settlement value comprises sampling market values for the commodity within a time window specified by the first data, discarding a portion of the sampled values, and computing the cash settlement value based on a statistical measure of the sampled values not discarded; and
   transmitting fourth data from the computer system, the fourth data indicating cash final settlement of each contract of the group by payment of the cash settlement value instead of by delivery of the defined quantity of the commodity.

2. The method of claim 1, wherein the cash settlement value is the same as to each contract of the group and the plurality of contracts comprises at least 100 contracts.

3. The method of claim 1, further comprising storing, by the computer system and for each contract of the group, data confirming cash settlement by payment of the cash settlement value.

4. The method of claim 1, wherein the second data comprises data indicating that delivery of a quantity of the commodity by holders of at least a portion of the contracts of the plurality is difficult.

5. The method of claim 1, wherein the commodity specified by the first data is one of an agricultural commodity, a foreign exchange commodity, an interest rate commodity, an equity commodity, an energy commodity, or a metals commodity.

6. The method of claim 1, wherein
   the commodity is a type of transferable benefit issued by a governmental entity, and
   receiving second data comprises receiving data indicating that the type transferable benefit is not available from the governmental entity.

7. A method comprising:
   storing first data at a computer system, the first data defining a multilaterally-traded contract type and specifying final settlement of contracts conforming to the contract type by delivery of a defined quantity of a commodity;
   receiving second data at the computer system, the second data indicating potential invocation of an alternate cash settlement mode for a plurality of contracts, wherein each contract of the plurality is a contract conforming to the contract type;
   receiving third data at the computer system, the third data indicating the alternate cash settlement mode is invoked for a group of contracts, wherein the group is at least a portion of the contracts of the plurality; and
   transmitting fourth data from the computer system, the fourth data indicating cash final settlement of each contract of the group by payment of a cash settlement value instead of by delivery of the defined quantity of the commodity, and wherein
   the first data specifies that a counterparty holding one of a long or short position in a contract of the contract type can invoke the alternate cash settlement mode if there is a corresponding holder of the other of the long or short position, in another contract of the contract type, willing to invoke the alternate cash settlement mode, and
   the contracts of the group comprise matched pairs of contracts, each pair of contracts including a contract for which the computer system has received data indicating a counterparty holding a long position has requested invocation of the alternate cash settlement mode and a corresponding contract for which the computer system has received data indicating a counterparty holding a short position has requested invocation of the alternate cash settlement mode, and further comprising
   identifying, by the computer system, the matched pairs of contracts.

8. The method of claim 7, wherein
   a first set of contracts of the contract type are held by one or more counterparties holding one of a long or short position,
   a second set of contracts of the contract type are held by one or more counterparties holding the other of a long or short position,
   the first set includes more contracts than the second set, and
   identifying the matched pairs of contracts comprises determining which contracts of the first set will be finally settled by delivery of the defined quantity of the commodity and which contracts of the first set will be finally settled according to the alternate cash settlement mode.

9. One or more non-transitory computer-readable media storing computer executable instructions that, when executed, cause a computer system to perform operations that include:
- storing first data, the first data defining a multilaterally-traded contract type and specifying final settlement of contracts conforming to the contract type by delivery of a defined quantity of a commodity;
- receiving second data, the second data indicating potential invocation of an alternate cash settlement mode for a plurality of contracts, wherein each contract of the plurality is a contract conforming to the contract type;
- receiving third data, the third data indicating the alternate cash settlement mode is invoked for a group of contracts, wherein the group is at least a portion of the contracts of the plurality;
- calculating a cash settlement value, wherein calculating the cash settlement value comprises sampling market values for the commodity within a time window specified by the first data, discarding a portion of the sampled values, and computing the cash settlement value based on a statistical measure of the sampled values not discarded; and
- transmitting fourth data, the fourth data indicating cash final settlement of each contract of the group by payment of the cash settlement value instead of by delivery of the defined quantity of the commodity.

10. The one or more non-transitory computer-readable media of claim 9, wherein the stored instructions further comprise instructions that, when executed, cause the computer system to perform operations that include storing, for each contract of the group, data confirming cash settlement by payment of the cash settlement value.

11. The one or more non-transitory computer-readable media of claim 9, wherein the second data comprises data indicating that delivery of a quantity of the commodity by holders of at least a portion of the contracts of the plurality is difficult.

12. One or more non-transitory computer-readable media storing computer executable instructions that, when executed, cause a computer system to perform operations that include:
- storing first data, the first data defining a multilaterally-traded contract type and specifying final settlement of contracts conforming to the contract type by delivery of a defined quantity of a commodity;
- receiving second data, the second data indicating potential invocation of an alternate cash settlement mode for a plurality of contracts, wherein each contract of the plurality is a contract conforming to the contract type;
- receiving third data, the third data indicating the alternate cash settlement mode is invoked for a group of contracts, wherein the group is at least a portion of the contracts of the plurality; and
- transmitting fourth data, the fourth data indicating cash final settlement of each contract of the group by payment of a cash settlement value instead of by delivery of the defined quantity of the commodity, and wherein
  - the first data specifies that a counterparty holding one of a long or short position in a contract of the contract type can invoke the alternate cash settlement mode if there is a corresponding holder of the other of the long or short position, in another contract of the contract type, willing to invoke the alternate cash settlement mode,
  - the contracts of the group comprise matched pairs of contracts, each pair of contracts including a contract for which the computer system has received data indicating a counterparty holding a long position has requested invocation of the alternate cash settlement mode and a corresponding contract for which the computer system has received data indicating a counterparty holding a short position has requested invocation of the alternate cash settlement mode, and
  - the stored instructions further comprise instructions that, when executed, cause the computer system to perform operations that include identifying the matched pairs of contracts.

13. The one or more non-transitory computer-readable media of claim 12, wherein
- a first set of contracts of the contract type are held by one or more counterparties holding one of a long or short position,
- a second set of contracts of the contract type are held by one or more counterparties holding the other of a long or short position,
- the first set includes more contracts than the second set, and
- identifying the matched pairs of contracts comprises determining which contracts of the first set will be finally settled by delivery of the defined quantity of the commodity and which contracts of the first set will be finally settled according to the alternate cash settlement mode.

14. A computer system comprising:
- at least one processor; and
- at least one non-transitory memory, wherein the at least one non-transitory memory stores instructions that, when executed, cause the computer system to perform operations that include
  - storing first data, the first data defining a multilaterally-traded contract type and specifying final settlement of contracts conforming to the contract type by delivery of a defined quantity of a commodity,
  - receiving second data, the second data indicating potential invocation of an alternate cash settlement mode for a plurality of contracts, wherein each contract of the plurality is a contract conforming to the contract type,
  - receiving third data, the third data indicating the alternate cash settlement mode is invoked for a group of contracts, wherein the group is at least a portion of the contracts of the plurality,
  - calculating a cash settlement value, wherein calculating the cash settlement value comprises sampling market values for the commodity within a time window specified by the first data, discarding a portion of the sampled values, and computing the cash settlement value based on a statistical measure of the sampled values not discarded, and
  - transmitting fourth data, the fourth data indicating cash final settlement of each contract of the group by payment of the cash settlement value instead of by delivery of the defined quantity of the commodity.

15. The computer system of claim 14, wherein the at least one non-transitory memory stores instructions that, when executed, cause the computer system to perform operations that include storing, for each contract of the group, data confirming cash settlement by payment of the cash settlement value.

16. The computer system of claim 14, wherein the second data comprises data indicating that delivery of a quantity of the commodity by holders of at least a portion of the contracts of the plurality is difficult.

17. A computer system comprising:

at least one processor; and at least one non-transitory memory, wherein the at least one non-transitory memory stores instructions that, when executed, cause the computer system to perform operations that include storing first data, the first data defining a multilaterally-traded contract type and specifying final settlement of contracts conforming to the contract type by delivery of a defined quantity of a commodity, receiving second data, the second data indicating potential invocation of an alternate cash settlement mode for a plurality of contracts, wherein each contract of the plurality is a contract conforming to the contract type, receiving third data, the third data indicating the alternate cash settlement mode is invoked for a group of contracts, wherein the group is at least a portion of the contracts of the plurality, and transmitting fourth data, the fourth data indicating cash final settlement of each contract of the group by payment of a cash settlement value instead of by delivery of the defined quantity of the commodity, and wherein the first data specifies that a counterparty holding one of a long or short position in a contract of the contract type can invoke the alternate cash settlement mode if there is a corresponding holder of the other of the long or short position, in another contract of the contract type, willing to invoke the alternate cash settlement mode, the contracts of the group comprise matched pairs of contracts, each pair of contracts including a contract for which the computer system has received data indicating a counterparty holding a long position has requested invocation of the alternate cash settlement mode and a corresponding contract for which the computer system has received data indicating a counterparty holding a short position has requested invocation of the alternate cash settlement mode, and the at least one non-transitory memory stores instructions that, when executed, cause the computer system to perform operations that include identifying the matched pairs of contracts.

18. The computer system of claim 17, wherein a first set of contracts of the contract type are held by one or more counterparties holding one of a long or short position, a second set of contracts of the contract type are held by one or more counterparties holding the other of a long or short position, the first set includes more contracts than the second set, and identifying the matched pairs of contracts comprises determining which contracts of the first set will be finally settled by delivery of the defined quantity of the commodity and which contracts of the first set will be finally settled according to the alternate cash settlement mode.

* * * * *